Sept. 15, 1964  W. T. RENTSCHLER  3,148,604
PHOTOGRAPHIC CAMERA
Filed May 24, 1963

INVENTOR.
Waldemar T. Rentschler
BY
Arthur A. March
ATTORNEY 3,148,604
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Filed May 24, 1963, Ser. No. 282,898
Claims priority, application Germany May 25, 1962
3 Claims. (Cl. 95—10)

This invention relates to photographic cameras having built-in exposure meters with means linked thereto to control the exposure parameters automatically. In particular, the invention relates to means for preventing the shutter from being operated to take a photograph when the light is unsuitable.

Cameras having an automatic control mechanism governed by an exposure meter built into the camera case for controlling the diaphragm aperture or the shutter speed or both automatically may be referred to simply as automatic cameras. In the past, some automatic cameras have been equipped with a locking device to prevent the release of the camera shutter when the light conditions are not suitable for taking photographs. In addition, proposals have even been made that such locking devices be selectively connected or disconnected. However, the locking devices proposed heretofore have been imperfect in operation and have been relatively expensive because of the special, manually-operable controls provided for the purpose of connecting or disconnecting them. Furthermore, these locking devices have required extra structural members and more space, thereby unnecessarily increasing the cost of the camera.

It is the primary object of the invention to provide an automatic camera having a locking device and means for selective connection or disconnection thereof without requiring additional structure or space.

The invention comprises a locking device associated with one of the exposure controls and arranged so that if the exposure control is in a position corresponding to either an excess or an insufficiency of light, the shutter mechanism cannot be operated. The locking device is connected to the control in such a way that the locking device may be disconnected, or rendered inoperable, without disabling the automatic mechanism governed by that control. The locking device is also disconnected when the camera is set for manual control of the exposure parameters.

In order to simplify construction of the camera, it is proposed that the locking device and the control to which it is connected be arranged on the shutter.

Details of the invention will become apparent from the specification that follows and from the accompanying drawing which illustrates an embodiment of the invention and in which.

Figure 1:
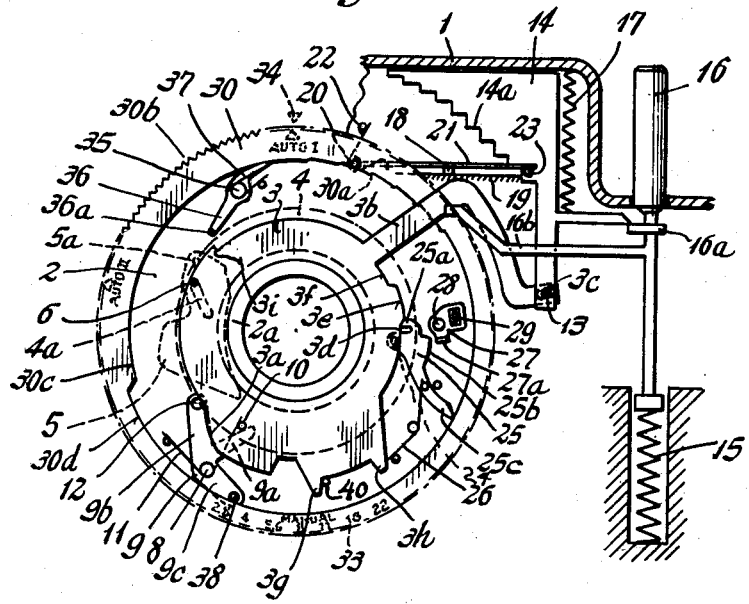
FIG. 1 shows a between-the-lens shutter from the rear and in connection with an automatic diaphragm setting device and a selectively connectible and disconnectible locking device which is associated with the diaphragm setting device.

In FIG 1 a fragment of a camera housing 1 is shown with a shutter 2 mounted thereon. The shutter includes a diaphragm which may be adjusted by means of a setting member 3 in the form of a ring rotatably mounted on a tubular extension 2a outside the housing of the shutter 2 and which cooperates with an actuating ring 4 for diaphragm lamellae 5 on the inside rear wall of the shutter. Only one of the diaphragm lamellae 5 is shown, in order to reduce the complexity of the drawing. All of these lamellae have bearing pins 5a that fit into a bearing plate (not shown), and all have slots 4a that engage pins 6 on the actuating ring 4 so that rotation of the ring 4 causes the lamellae to pivot about the pins 5a and thus to change the aperture defined by the lamellae.

On the rear wall of the shutter 2 is a pin 8 on which a three-armed lever 9 is pivotally mounted. One arm 9a engages a pin 10 on the actuating ring 4 to control the rotation of this ring in accordance with the rotation of the lever. A spring 11 presses the ring 4 counter-clockwise and the lever 9 clockwise, initially. A second arm 9b has a pin 12 that serves as a cam follower for a cam 3a on the setting member 3. As may be seen, clockwise rotation of the setting member 3 causes the pin 12 to ride up on the cam 3a and thus to rotate the lever 9 counterclockwise. This movement, in turn, is imparted to the ring 4 via the pin 10 and rotates the ring 4 clockwise, causing the lamellae 5 to swing inwardly as they are rotated counter-clockwise about their bearing pins 5a. The lamellae start in the position of largest aperture size and swing counter-clockwise toward positions of successively smaller aperture size. As will be discussed hereinafter, the lamellae actually start in a position to define an aperture of somewhat larger size than the largest usable size.

For the purpose of automatically setting the diaphragm lamellae 5, the setting member 3 is provided with a radially extending actuating arm 3b which, at its free end, has a slot 3c that fits over a pin 13 on a sensing member 14, which moves in a direction perpendicular to the optical axis of the camera. The purpose of the sensing member 14 is to sense the position of the movable measuring mechanism member of a built-in exposure meter. The sensing is done each time the shutter release trigger 16 is depressed in order to take a photograph. The trigger is normally held in its upper position by a spring 15, and the sensing member 14, in turn, is kept in engagement with a flange 16a of the shutter release trigger 16 by the downward pressure of a spring 17, which is somewhat weaker than the spring 15, so that the sensing member 14 occupies the position shown in FIG. 1 when the shutter trigger 16 is in its normal position.

A stepped cam 14a is developed on the sensing member 14, and when the trigger 16 is actuated one of its steps is pressed against a needle 18 which is rigidly connected to the movable measuring mechanism member of the built-in exposure meter and which, in order to avoid being damaged, bears against a fixed stop 19. At the beginning of the sensing operation, the needle 18 is secured by means of a clamping device in whatever position the needle happens to occupy because of the light intensity of the scene to be photographed. For this purpose, a lever 21 is provided, which is pivotable about a fixed axis 20 and which, in the starting position of the sensing member 14, is pressed by a spring 22 against a pin 23 on the sensing member, which holds the lever 21 clear of the needle 18. The needle is thus able to move freely back and forth. When the sensing process is initiated by operation of the shutter trigger 16, the lever 21 first engages the needle 18 and presses it against the fixed stop 19 so that it cannot skid off to one side.

The position of the needle 18 determines the distance to be traveled by the sensing member 14 during the automatic exposure setting and depends on the light intensity prevailing during an exposure as well as on the setting of other factors influencing the exposure beside the diaphragm aperture setting, such as the shutter speed, or exposure time, the film sensitivity, and the effect of any filter that may be used. These factors can be taken into consideration in the setting of the movable measuring mechanism member in any known manner, for example, by changing the normal position of the measuring mechanism. In order to obtain an initial free path for the sensing member 14 to permit the measuring mechanism needle 18 to be clamped, the lamellae 5 are pivoted initially to an aperture which is slightly wider than the maximum diaphragm aperture value "2.8" provided for. This gives to the lamellae a small preliminary path within which the clamping of the measuring mechanism needle 18 is effected by means of the lever 21 when the shutter trigger 16 is actuated.

In order to exclude faulty exposures in the camera, a locking device is provided to prevent the shutter from being released if, in view of the light conditions prevailing when the photograph is taken and of the preset exposure factor, exposure parameters would be required which would be outside the operating range of the camera. For example, if the light were insufficient to permit a satisfactory photograph with even the largest diaphragm aperture, in the present embodiment, the locking device would prevent the shutter from being actuated. Similarly, and less obviously, an exposure would not be permitted if the light were too bright for the smallest aperture.

The locking device shown is a lever 25 which is pivotally mounted on a fixed pin 24 at the rear wall of the shutter 2, and is urged counter-clockwise by a spring 26. The lever 25 has a lug 25a extending perpendicularly from one end and serving as a follower for a cam formed of the sections 3d, 3e and 3f on the circumference of the setting member 3. The length of the cam section 3e corresponds to the setting range of the diaphragm which extends, for example, from the value "2.8" to the value "22." The lever 25 also has an edge 25b which may or may not intercept a bent-off lug 27a of a lever 27, depending on whether the locking device is in its locked or unlocked position. The lever 27 is pivotally mounted on a pin 28 at the rear wall of the shutter 2 and is also connected to an arm 29, which projects through the rear wall of the intra-lens shutter and is connected to a known type of shutter release device.

Now, if, after the diaphragm lamellae 5 have been set, the lug 25a is in contact with the cam section 3e of the setting member 3, which will be the case when the light conditions are suitable for taking a photograph, the edge 25b of the locking device is located outside the path of motion of the lug 27a. In this setting position of the locking device 25, the lever 27 can be moved in the clockwise direction and, as a result, the shutter trigger 16 can be depressed to its end position, permitting the arm 16b to impinge on the arm 29 and to bring about the release of the shutter 2.

If the light conditions are not suitable for taking a photograph, that is, if there is either too little or too much light, the setting member 3 moves in accordance with the position of the needle 18 into a position in which the lug 25a bears against one of the lower cam sections 3f or 3d of the setting member 3. In both of these cases, the admissible diaphragm setting range is exceeded. Due to the action of its spring 26, the arresting lever 25 can pivot about its bearing axle 24 in the counter-clockwise direction to such an extent that its edge 25b enters the path of motion of the lug 27a, thereby preventing the lever 27 from pivoting, which, in turn, prevents actuation of the shutter 2. The entire path of rotation of the setting member 3 is greater than the path of rotation required for the admissible diaphragm setting range and is limited by stops 3g and 3h that cooperate with a fixed stop pin 40.

As explained, when the locking device 25 is operating, photographs can be taken only if the light conditions are suitable for this purpose, that is, only if the setting member 3 is pivoted to a position located within the admissible diaphragm setting range when the shutter trigger is depressed. As a result, it is impossible to take a photograph when the setting member 3 is outside of the permissible range, even by a small amount which would not influence the result of the exposure to any great extent. However, it may sometimes occur that photographs with over-exposure or under-exposure are desired, even in the case of automatic setting of exposure parameters.

For this purpose, the camera is provided with means which make it possible selectively to connect or disconnect the locking device 25. In order to avoid complicated and bulky structures, the connecting or disconnecting of the locking device is arranged to be effected by means of a control 30 which is the control for manually setting the diaphragm lamellae 5 as well as for switching the camera from the "Manual" working range to the "Automatic" working range. The control 30 is provided with control means, such as a cam 30a, which cooperates with an extension 25c of the locking device 25 so that the locking device is operable when the control 30 is in the "Auto I" setting position (FIG. 1) but is inoperable when the control 30 is in the "Auto II" setting position, depicted in FIG. 2. In the embodiment shown, the control 30 is in the form of a rotatable ring which is positioned concentrically to the optical axis and is located on the housing of the shutter 2. The control is provided with a knurled outer circumference 30b and a scale 33 of diaphragm values that may be manually set opposite a fixed mark 34.

In both setting positions "Auto I" and "Auto II" of the control 30, the automatic diaphragm setting device comprising the setting member 3 and the sensing member 14 is operative, in which case, as already described above, the diaphragm is set under the control of the exposure meter.

But if the control 30 is switched to the "Manual" setting range by rotating the control so that one of the values of the diaphragm scale 33 is put opposite the mark 34, the automatic diaphragm setting device, including the setting ring 3 and the sensing member 14, is locked in its starting position. The locking of the setting member 3 is effected by means of a lever 36 which is rotatably positioned on a pin 35 at the rear wall of the shutter 2 and which cooperates at one end with the control 30 and at the other end with the setting member 3. The lever 36 is urged in the counter-clockwise direction by a spring 37, but the lever bears against the cam section 30c when the control 30 is in either of the setting positions "Auto I" or "Auto II," thus keeping the other end of the lever with its lug 36a out of the path of motion of a stop edge 3i provided on the setting member 3. However, when the control 30 is set to its "Manual" setting range, the concentric, recessed portion 30d of the setting member 30 is opposite the lever and permits the latter to rotate so that the end 36a is directly in the path of the stop edge 3i. As a result, when the shutter trigger 16 is depressed, the stop edge 3i of the setting member 3 runs against the bent-off lug 36a of the lever 36, preventing the setting member 3 from carrying out a further rotary clockwise motion. In the embodiment shown, the cam 30a that serves to connect or disconnect the locking device 25 serves also as a diaphragm setting cam which becomes operative in the "Manual" setting range of the camera. In the "Manual" setting range, a pin 38 on the arm 9c of the lever 9 engages the cam 30a as a follower and rotates the lever 9, and hence the actuating ring 4 to cause manual setting of the diaphragm lamellae 5.

The mode of operation of the camera is the following:

If the control 30 is set in its "Auto I" position, as shown in FIG. 1, and if the needle 18 occupies the position shown when the shutter trigger 16 is depressed against the action of its spring 15, the sensing member 14 and the setting member 3 connected thereto follow the shutter trigger 16 due to the influence of the spring 17, the needle 18 being first clamped in position by means of the lever 21. The motion of the setting member 3 is transmitted, by its cam 3a and by the lever 9 to the diaphragm actuating ring 4, which thereby pivots the diaphragm lamellae 5 from their starting position, which is associated with the largest aperture width, in the direction of the smallest diaphragm aperture. The automatic setting of the diaphragm is terminated as soon as one of the steps 14a of the sensing member 14 impinges on the needle 18. Upon further depression of the shutter trigger 16, its arm 16b presses against the arm 29 of the shutter release device and thereby initiates the operation of the shutter 2. The arresting lever 25 is pivoted by the cam section 3e into a setting position in which its edge 25b is outside the path of motion of the lug 27a of the lever 27.

Figure 2:
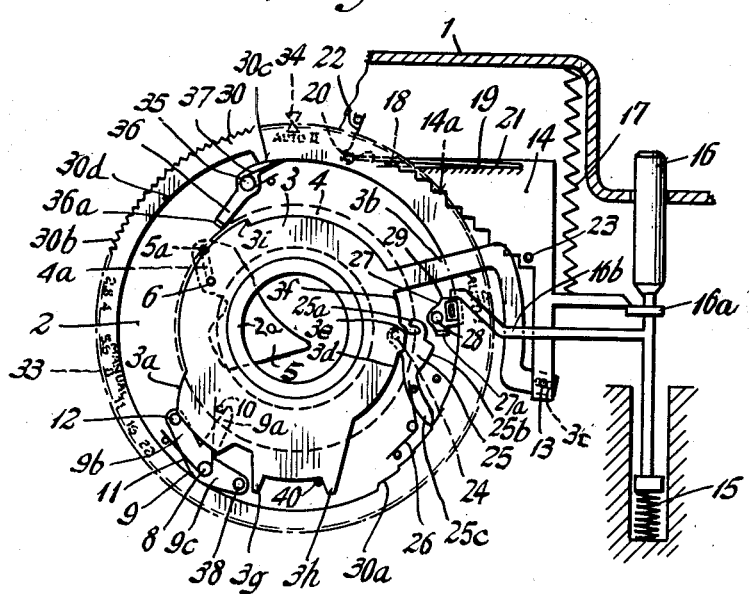
FIG. 2 shows the same arrangement as FIG. 1 at a different setting of the control.

But if the needle 18 occupies the extreme leftward position of FIG. 2, which will be the case if there is too much light, the setting member 3 connected to the sensing member 14 reaches a setting position in which the lug 25a of the locking device 25 engages the cam section 3f of the setting member 3. As a result, the edge 25b is now in the path of motion of the lug 27a, which prevents rotary counter-clockwise motion of the lever 27 required to release the shutter.

Now if an exposure with automatic diaphragm setting is to be carried out despite the existence of light conditions which are outside the admissible diaphragm setting range, the control 30 must be moved into the "Auto II" setting position shown in FIG. 2. In this case, the cam 30a of the setting member 30 is moved into position to engage the extension 25c of the locking device 25, which pivots the locking device into the position illustrated in FIG. 2. In that position of the locking device, the edge 25b is located outside the path of motion of the lug 27a, and if the shutter trigger 16 is then depressed, the lever 27 connected to the shutter release arm 29 is able to go through the clockwise pivoting motion required for releasing the shutter without being impeded, even if the existing light conditions are not within the working range of the camera.

For the purpose of taking photographs with manual setting of the diaphragm lamellae, the control 30 is set to a value indicated within its "Manual" setting range, as indicated by placing a point on the diaphragm scale 33 opposite the fixed mark 34. During this setting motion, the cam surface 30c moves away from the lever 36, and the latter comes to rest on the recessed portion 30d. As a result, the bent-off lug 36a of the lever 36 is pressed by the spring 37 beyond the projection 3i developed on the setting member 3, thereby blocking the setting member in its starting position. Upon this setting motion of the control 30, its cam 30a, which also controls the manual diaphragm setting, engages the pin 38 of the lever 9 and pivots the latter in the counter-clockwise direction about its pivot pin 8, whereby the diaphragm lamellae are moved to a position to form an aperture of the value indicated on the scale 33.

I claim:

1. A photographic camera comprising an exposure meter; an exposure setting device connected thereto and controlled automatically in response to the measuring result of said exposure meter; a shutter; a selectively connectible or disconnectible locking device connected to said exposure setting device and controlled thereby, said locking device being connected to said shutter to prevent operation thereof if the light conditions prevailing during the exposure are outside the working range of the camera; a control for setting at least one of the exposure parameters, said control having at least one automatic position and a range of manually-controlled positions; and a control cam arranged on said control and operatively connected to said locking device to connect and disconnect the same.

2. A photographic camera comprising an exposure meter; an exposure setting device connected thereto and controlled automatically in response to the measuring result of said exposure meter; a shutter; shutter operating mechanism; a selectively connectible or disconnectible locking device connected to said exposure setting device and controlled thereby, said locking device being located adjacent to said shutter operating mechanism to prevent operation thereof if the light conditions prevailing during the exposure are outside the working range of the camera; a control for setting at least one of the exposure parameters, said control having at least two automatic positions and a range of manually-controlled positions; and a control cam arranged on said control and having different sections operatively engaging said locking device to connect and disconnect the same, said cam having a first section corresponding to said range of manually-controlled positions of said control and a second section corresponding to one automatic position of said control and a third section corresponding to a second automatic position of said control, said cam disconnecting said locking device when either of said first and second sections engage the same and said cam connecting said locking device when said third section engages the same.

3. A photographic camera comprising an exposure meter; an exposure setting device connected thereto and controlled automatically in response to the measuring result of said exposure meter; a shutter; shutter operating mechanism; a shutter housing; a selectively connectible or disconnectible locking device connected to said exposure setting device and controlled thereby, said locking device being located adjacent to said shutter operating mechanism to prevent operation thereof if the light conditions prevailing during the exposure are outside the working range of the camera; a control for setting at least one of the exposure parameters, said control having at least two automatic positions and a range of manually-controlled positions; and a control cam arranged on said control and having different sections operatively engaging said locking device to connect and disconnect the same, said cam having a first section corresponding to said range of manually-controlled positions of said control and a second section corresponding to one automatic position of said control and a third section corresponding to a second automatic poistion of said control, said cam disconnecting said locking device when either of said first and second sections engage the same and said cam connecting said locking device when said third section engages the same, said control and said locking device being mounted on said shutter housing.

References Cited in the file of this patent
UNITED STATES PATENTS

| | | |
|---|---|---|
| 3,087,398 | Greger | Apr. 30, 1963 |
| 3,093,040 | Kiper | June 11, 1963 |
| 3,097,582 | Winkler | July 16, 1963 |